UNITED STATES PATENT OFFICE.

EMIL ABDERHALDEN, OF HALLE, GERMANY.

SERUM THERAPY.

1,196,065.  Specification of Letters Patent.  Patented Aug. 29, 1916.

No Drawing. Original application filed August 27, 1915, Serial No. 47,692. Divided and this application filed December 1, 1915. Serial No. 64,527.

*To all whom it may concern:*

Be it known that I, EMIL ABDERHALDEN, professor of physiology, doctor of medicine, subject of the German Empire, residing at Halle, Germany, have invented new and useful Improvements in Serum Therapy, of which the following is a specification.

This invention relates to methods for determining the particular variety of cancer in an animal affected therewith and more particularly to a method for ascertaining whether or not the cancer of a cancer carrier is biologically related to cancer of known variety, or to an antiserum which has been produced by the known variety of cancer.

This application is a division of my application, Serial Number 47,692 filed August 27, 1915.

In my application, Serial Number 28,195 filed May 14, 1915, I have described new kinds of sera containing protective ferments which have an unusually powerful lysing action on cancerous tissues. These sera are obtained by injecting cancer albumin into an animal, withdrawing serum therefrom before the protective ferments first formed have disappeared, injecting said serum into a fresh animal to produce a serum of augmented strength in protective ferments, and continuing the transference of serum through a series of animals until a serum of the desired potency is secured. The potentiated serum so obtained has the valuable property that if injected into human beings suffering with carcinoma, for instance, it manifests distinct curative effects, as has been demonstrated by many clinical tests. This potentiated serum appears to have a specific destructive (lysing) action only on the particular protein or protein derivative which originally induced its formation. Thus if cancer tissue or any other kind of tissue, or any peptone-mixture obtained from the protein of such tissues, is introduced parenterally (*i. e.* subcutaneously or intravenously) into animals or human beings, there appear in the serum of the animal or human being, protective ferments which have a selective action upon the particular albumins or peptones introduced. Before using the potentiated serum in the treatment of cancer it is therefore necessary to make sure that the serum to be used corresponds to the particular variety of the albumen in the cancer to be treated.

The potentiated serum obtained from the series of animals is called anti-cancer serum, in contradistinction to the serum derived from the tumor carrier to be treated. If the anti-cancer serum be brought in contact with the particular variety of cancer albumin which had been used in its preparation a reaction will occur which is evidenced by the formation of dialyzable substances. Based on these observations, the following method of verifying the biological relationship between a certain anti-cancer serum and the serum of a cancer carrier has been developed: An anti-cancer serum is allowed to react on a certain cancerous tissue which is supposed to be related to said serum, and according to well known methods it is determined whether dialyzable substances are formed or not. Then the serum of the cancer carrier is also allowed to react on another portion of the same cancer tissue. If the results are identical in both cases, that is, if both sera cause cleavage, the antiserum is considered to conform to the serum of the cancer carrier.

*Treatment of the cancer carrier.*—After it has been determined that the serum of the cancer carrier conforms to a certain antiserum, the cancer carrier to be treated is parenterally inoculated with the antiserum. The properly selected antiserum manifests distinct curative effects in the cancer carrier, and complete disappearance of cancers of various types has been observed.

I claim:

A method of verifying the biological relationship between an anti-cancer serum and the serum of a cancer carrier which consists in causing said anti-cancer serum to react on a portion of a supposedly related cancer-tissue, causing the serum of a cancer carrier to react on another portion of the same cancer tissue, and then determining whether or not the cleavage effects of the two sera on the cancer tissue are the same, substantially as described.

In testimony whereof I have hereunto set my hand in the presence of two subscribing witnesses.

EMIL ABDERHALDEN.

Witnesses:
RUDOLPH FRICKE,
WM. P. KENT.